Figure 1:
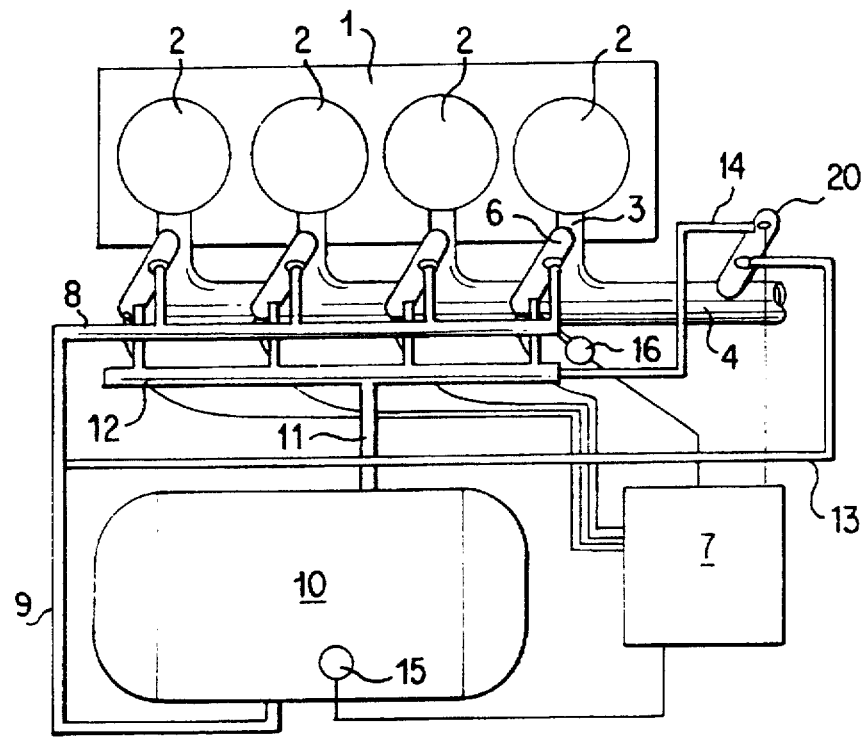

United States Patent [19]

Smith

[11] Patent Number: 5,775,281

[45] Date of Patent: Jul. 7, 1998

[54] DETERMINATION OF HEAT SOAK CONDITIONS

[75] Inventor: Rodney Sinclair Smith, South Australia, Australia

[73] Assignee: The Energy Research and Development Corporation, Australia

[21] Appl. No.: 765,084

[22] PCT Filed: Jun. 21, 1995

[86] PCT No.: PCT/AU95/00368

§ 371 Date: Dec. 20, 1996

§ 102(e) Date: Dec. 20, 1996

[87] PCT Pub. No.: WO95/35442

PCT Pub. Date: Dec. 28, 1995

[30] Foreign Application Priority Data

Jun. 21, 1994 [AU] Australia ............... PM6323

[51] Int. Cl.⁶ ............................................. F02N 17/00
[52] U.S. Cl. ............... 123/179.8; 123/576; 123/578
[58] Field of Search ............. 123/179.8, 525–529, 123/575, 576, 578, 516

[56] References Cited

U.S. PATENT DOCUMENTS

| | | |
|---|---|---|
| 4,430,978 | 2/1984 | Lewis et al. |
| 4,936,280 | 6/1990 | Langlois .................. 123/578 |
| 5,119,775 | 6/1992 | Kokubo et al. ............ 123/179.7 |
| 5,228,423 | 7/1993 | Oikawa et al. ............ 123/525 |
| 5,377,645 | 1/1995 | Moore ...................... 123/525 |
| 5,450,832 | 9/1995 | Graf ......................... 123/525 |
| 5,549,083 | 8/1996 | Feuling .................... 123/179.8 |
| 5,592,924 | 1/1997 | Audisio et al. ............ 123/525 |
| 5,623,907 | 4/1997 | Cotton et al. ............. 123/525 |
| 5,628,294 | 5/1997 | Krieckaert et al. ........ 123/525 |

FOREIGN PATENT DOCUMENTS

| | | | |
|---|---|---|---|
| 60-65261 | 4/1985 | Japan .................... 123/525 |
| 81/00282 | 2/1981 | WIPO . |
| 89/00640 | 1/1989 | WIPO . |

*Primary Examiner*—Erick R. Solis
*Attorney, Agent, or Firm*—Evenson, McKeown, Edwards & Lenahan, P.L.L.C.

[57] ABSTRACT

A method and an arrangement for determining the presence of heat soak conditions in an internal combustion engine (1) of a type using fuel injection. Particularly useful when the or one of the fuels used in the engine (1) is susceptible to vaporisation in a fuel rail (8) due to high engine temperatures. The method includes the steps of measuring a first temperature in a tank (10) for the fuel, measuring a second temperature at the fuel rail (8), ascertaining the difference between the first and second temperature, wherein a significant difference indicates heat soak conditions. If heat soak conditions are detected then an auxiliary injector (20) may be operated or in dual fuel engines a higher boiling point fuel may be used.

18 Claims, 1 Drawing Sheet

DETERMINATION OF HEAT SOAK CONDITIONS

FIELD OF INVENTION

This invention relates to fuel injection systems for internal combustion engines and methods of operation of such systems.

BACKGROUND OF THE INVENTION

Liquid fuels which can be injected using fuel injection are petrol, LNG and LPG. This present invention will be discussed mainly in relation to LPG but can be also applicable to petrol and low boiling point or high vapour pressure fuels. The invention is applicable to internal combustion engines operating with a single fuel or to such engines operating with dual fuels.

Fuel injection systems for internal combustion engines can be adapted to supply liquid fuels to the inlet manifold for each cylinder of an internal combustion engine. This system is known as multi-point liquid fuel injection. By suitable control of the operation of the injectors accurate amounts of liquid fuel can be supplied to each cylinder depending upon engine conditions and demand characteristics.

There is a problem, however, in that for liquid fuel injection to be accurate the fuel in the injectors adjacent the injection point must be liquid at all times.

The environment around each cylinder, however, can at times during engine operation be very hot and such a temperature in this region is not conducive to injection of a liquid fuel which has a low boiling point.

LPG (propane and butane) is in equilibrium pressure state with both gas and liquid being present inside a fuel tank of a vehicle because of its properties, that is its boiling point is usually lower than the ambient temperature (when the temperature is above zero). Considering these properties of LPG, the liquid will vaporise when the surrounding temperature is higher than the liquid temperature.

In a practical situation, such as liquid LPG flowing to a fuel rail and injectors of a fuel injection system, in under-bonnet typical temperatures, it will remain in a liquid state where there is a sufficient recirculation rate only. While the vehicle is running care is taken to ensure that there is sufficient circulation flow rate, minimum number of restrictions and some pressure elevation above that of the equilibrium pressure to maintain the liquid state. When the vehicle has been running and is stopped and the engine is not running, however, the LPG liquid in the fuel rails and injectors immediately starts to vaporise due to the high under-bonnet temperatures relative to the liquid temperature. This process will tend to raise the pressure in the fuel rail but the general design of fuel rails is to prevent build up of an overpressure by a relief valve. A mixture of liquid and vapour therefore flows into the LPG tank via a return line. It will be seen therefore that from the instant that recirculation stops the liquid in the fuel rail is replaced by dry gas and the temperature in the fuel rail injectors and valves start to rise steadily because of the heat transfer from the various components and the under-bonnet conditions. The rise in temperature and heating is a function of time and the surrounding temperature. The surrounding temperature is also a function of previous engine loads, engine speeds and running time.

These conditions may be referred to as heat soak conditions.

Starting the fuel pump after a heat soak condition will draw liquid LPG from the bottom of the fuel tank and the liquid is transferred into the fuel rail, injectors and valves. As the liquid fills the fuel rail it starts to vaporise until the surface temperature drops to that of the liquid temperature with a gradient distribution due to flow. The time taken for the fuel rail assembly to equalise in temperature to that of the liquid is dependant on the temperature of the LPG in the tank, fuel rail and injector design, surface to volume ratio of the metal parts and the absolute temperature of the fuel rail assembly.

It is an object of this invention, therefore, for efficient operation of a fuel injected engine operating with low boiling point fuels, to be able to determine by an easy method when such heat soak conditions occur so that suitable action may be taken to overcome the heat soak conditions before starting the engine or upon starting the engine.

It is a further object of this invention to provide an apparatus suitable for determination of such heat soak conditions.

SUMMARY OF THE INVENTION

In one form therefore although this may not necessarily be the only or broadest form the invention is said to reside in a method of determination of heat soak conditions in an internal combustion engine using fuel injection where the or one of the fuels used in the engine is susceptible to vaporisation in fuel rails due to high engine temperatures, the method including the steps of measuring a first temperature in a tank for the fuel, measuring a second temperature at the fuel rail and ascertaining the difference between the first and second temperature, wherein a significant difference indicates heat soak conditions.

In an alternative form the invention is said to reside in an apparatus to enable the determination of heat soak conditions in an internal combustion engine operated by fuel injection, comprising means to determine a first temperature in a fuel rail for the fuel injector, means to determine a second temperature in a fuel tank for the fuel and means to subtract the first temperature from the second temperature, wherein heat soak conditions are present if the first temperature minus the second temperature is greater than a selected value.

The fuel as discussed above may be petrol, LNG or LPG in a single fuel vehicle or may be petrol and LPG or LNG with a dual fuel vehicle.

A significant difference in the temperature between the fuel tank and the fuel rail may be in the range of 2° C. to 5° C. or greater, depending upon the actual construction of the fuel rail and fuel tank, the positions of the sensors in or on the fuel rail and fuel tank, the type of sensor used, the heat capacity of the rail and the type of fuel being used.

The type of sensor may be a liquid probe temperature sensor or a surface contact temperature detector.

It will be seen that by this invention there is provided a cost effective method and apparatus for detecting the under bonnet heat soak conditions by placing a temperature sensor on the fuel rail and a temperature sensor in or on the fuel tank.

The location of the temperature sensor on the rail and tank is relative, that is, the calibration will vary depending upon the location of the sensor. The sensor can either be a liquid probe or a surface contact external detector insulated from the surroundings. A relatively fast response sensor is preferred to ensure prompt indication of temperature. Such a sensor should have a response of about one second.

Preferably the temperature sensor on the fuel rail is positioned adjacent to the last injector on the fuel rail where the fuel line returns to the fuel tank. Once fuel is circulating again it will take longest to get to that point and cool that point down sufficiently for the liquid LPG to remain useable as a fuel at the operating pressure.

A method by which the heat soak determination may be done is as follows. On turning on the ignition key an electronic control unit for the fuel injection reads the two temperature inputs from the fuel rail and the fuel tank and calculates a temperature difference ($\Delta T$). The temperature difference is then entered into a look-up table and an engine state is determined. If the temperature difference is greater than a predetermined value, typically 2° to 5° C. then it is determined that there are heat soak conditions present. Depending on the value of the temperature difference a time of running on some alternative fuel supply system will be obtained from the look-up table.

During the period that heat soak conditions are present the engine can only run by other means. Such other means may be by use of an alternatve fuel such as petrol or by injection of fuel into an air intake line at a position remote from the engine where the temperature is not so high.

Alternatively, starting of the engine may be prevented and only pumping of fuel may occur until such time as the heat soak condition has been alleviated.

During the period that the engine is running by such other means the fuel pump for instance the LPG pump may be pumping liquid in the fuel rail assembly and maintaining recirculation until the fuel rail is cooled and $\Delta T$ becomes equal to or less than the predetermined value. The actual time taken to cool the fuel rail assembly depends upon various factors such as the actual temperature and the heat capacity of the fuel rail and typically it may vary from 2 to 15 seconds or longer.

In an alternative system there may be used fast acting temperature sensors on both the fuel tank and the fuel rail and rather than calculating a time to operate on the alternative fuel supply system there may be continuous checking of the temperature difference until the difference is less than a selected value, for instance typically 2° to 5° C. at which time the alternative fuel supply system is switched off and the normal fuel supply system is used.

One advantage of a continuous detection system is that unwanted emissions may be avoided by going back to the more efficient fuel as soon as possible rather than after a fixed time which may not be optimum for all conditions and temperatures.

This generally describes the invention but to assist with understanding of the invention reference will now be made to a preferred embodiment of the invention as shown in the accompanying drawings.

In the drawings

Figure 2:
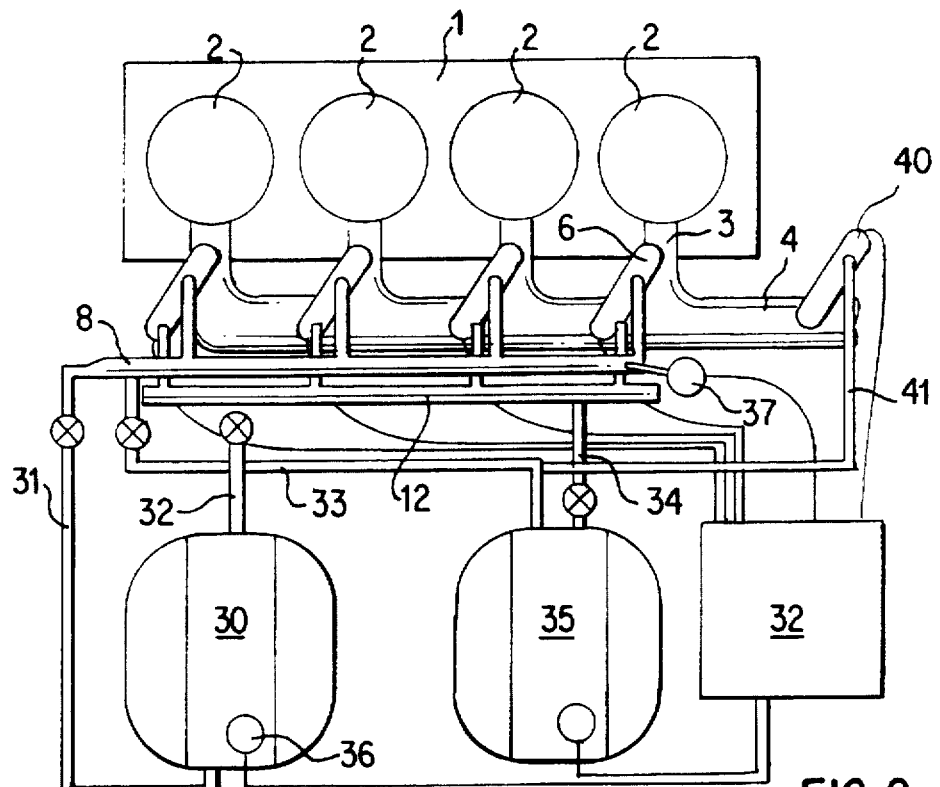

FIG. 1 shows a schematic view of an engine and single fuel supply system embodying the present invention, and FIG. 2 shows a schematic view of an engine and dual fuel supply system embodying the present invention In FIG. 1 an engine 1 shown schematically has four cylinders 2. Each cylinder is fed inlet air through inlet pipe 3 from inlet manifold 4. An injector 6 injects the necessary fuel as determined by an injector controller 7 into the inlet pipe 3. Fuel is supplied via a fuel rail 8 from a fuel line 9 extending to a fuel tank 10. A fuel return rail 12 and line 11 allows excess fuel to be returned to the fuel tank 10.

When there is an attempt to start the engine incorporating the present invention the controller 7 measures the temperature at the fuel tank 10 by means of a temperature probe 15 and on the fuel rail 8 by means of temperature probe 16. The temperature in the tank is subtracted from the temperature in the rail and if the temperature difference is greater than perhaps 2° to 5° C. then the system assumes that there is at least some heat soak conditions present in the fuel rail and injectors and the controller 7 activates a further injector 20 to inject fuel into the inlet manifold 4 at a point remote from the engine.

In FIG. 2 a substantively similar construction of engine is provided with the same items having the same reference numerals.

This system however is a dual fuel system where a first fuel tank 30 has a low boiling point fuel and a second fuel tank 35 has a higher boiling point fuel. Fuel from the tank 30 is supplied to the inlet rail 8 by inlet fuel line 31 and excess fuel is returned to the tank 30 by means of outlet fuel rail 12 and return fuel line 32. Fuel from the tank 35 is supplied to the inlet rail 8 by inlet fuel line 33 and excess fuel is returned to the tank 35 by means of outlet fuel rail 12 and return fuel line 34.

If upon engine starting the temperature difference between the temperature calculated in the fuel tank 30 by means of probe 36 and the temperature calculated in the fuel rail by means of probe 37 then the engine is operated on the higher boiling point fuel from the tank 35 and fuel is pumped to the auxiliary injector 40 by means of fuel line 41 which branches off fuel inlet line 33 from the tank 35. The auxiliary injector is mounted on the inlet manifold 4 at a position remote from the engine.

We have seen that by this invention the presence of heat soak conditions can be determined when it is intended to start an engine by comparison of temperatures in two critical points.

It will be realised of course that if the temperature difference is less than a selected value then the engine could be operated using the main injectors 6 with either the low boiling point fuel or the high boiling point fuel.

This present invention therefore provides a convenient method and apparatus by which heat soak conditions in an internal combustion engine may be detected.

I claim:

1. Method of operating a fuel injected dual fuel internal combustion engine which utilizes alternatively a first fuel having a low boiling point and being susceptible to vaporization in a fuel rail due to high engine temperature, and a second fuel having a higher boiling point, said method comprising:

measuring a first temperature in a tank for said first fuel;

measuring a second temperature at a fuel rail of said engine;

determining a temperature difference between said first and second temperatures;

when upon starting of said engine said temperature difference exceeds a threshold value, determining existence of a heat soak condition and causing said engine to switch from said first fuel to said second fuel.

2. Method according to claim 1, wherein the temperature sensors are liquid probe temperature sensors.

3. Method according to claim 1, wherein the temperature sensors are surface contact temperature sensors.

4. Method according to claim 1, wherein the step of switching from the low boiling point fuel to the higher boiling point fuel upon starting when heat soak conditions are detected comprises the step switching to an auxiliary injector.

5. Method according to claim 1 further comprising:

determining a time duration for continuation of said heat soak condition as a function of a magnitude of said temperature difference, by accessing stored characteristic information in a memory.

6. Method according to claim 5 wherein said stored characteristic information comprises a look-up table.

7. Method according to claim 5 further comprising:

causing said engine to switch from said second fuel to said first fuel at an end of said time duration for continuation of said heat soak conditions.

8. Method according to claim 1 further comprising:

determining a time duration for continuation of said heat soak condition by continuously measuring said first and second temperatures and determining a continuation of said heat soak condition so long as said temperature difference exceeds said threshold value.

9. Method according to claim 8 further comprising:

causing said engine to switch from said second fuel to said first fuel at an end of said time duration for continuation of said heat soak conditions.

10. Apparatus for controlling operation of a fuel injected dual fuel internal combustion engine which utilizes alternatively a first fuel having a low boiling point and being susceptible to vaporization in a fuel rail due to high engine temperature, and a second fuel having a higher boiling point, said apparatus comprising:

a first temperature sensor arranged to detect a first temperature in a tank for said first fuel;

a second temperature sensor arranged to detect a second temperature at a fuel rail of said engine;

a difference unit coupled to receive signals from said first and second temperature sensors, and to generate a difference signal indicative of a difference therebetween; and a control unit coupled to receive said difference signal, and upon starting of said engine when said difference signal exceeds a threshold value, determining existence of a heat soak condition and causing said engine to switch from said first fuel to said second fuel.

11. Apparatus according to claim 10 wherein the temperature sensors are liquid probe temperature sensors.

12. Apparatus according to claim 10 wherein the temperature sensors are surface contact temperature sensors.

13. Apparatus according to claim 10 further including an auxiliary injector for the high boiling point fuel for use when heat soak conditions are detected upon starting.

14. Apparatus according to claim 10 further comprising a memory having stored therein characteristic information for determining a time duration for continuation of said heat soak condition as a function of a magnitude of said temperature difference.

15. Apparatus according to claim 14 wherein said stored characteristic information comprises a look-up table.

16. Apparatus according to claim 14 wherein said control unit causes said engine to switch from said second fuel to said first fuel at an end of said time duration for continuation of said heat soak conditions.

17. Apparatus according to claim 10 wherein:

measurement of said first and second temperatures is performed continuously; and said control unit determines a continuation of said heat soak condition so long as said temperature difference exceeds said threshold value.

18. Apparatus according to claim 17 wherein said control unit causes said engine to switch from said second fuel to said first fuel at an end of said time duration for continuation of said heat soak conditions.

* * * * *